United States Patent [19]

Virnig et al.

[11] Patent Number: 5,670,035
[45] Date of Patent: Sep. 23, 1997

[54] METHOD FOR RECOVERING COPPER

[75] Inventors: Michael J. Virnig, Tucson, Ariz.; J. Murdoch MacKenzie, Gisborne, Australia

[73] Assignee: Henkel Corporation, Plymouth Meeting, Pa.

[21] Appl. No.: 466,166

[22] Filed: Jun. 6, 1995

[51] Int. Cl.⁶ ............... C25C 1/12; C22B 3/30; C22B 3/28
[52] U.S. Cl. ............ 205/345; 205/580; 205/581; 423/24
[58] Field of Search ............... 205/574, 580, 205/581, 345; 423/24; 75/711, 429

[56] References Cited

U.S. PATENT DOCUMENTS

| | | | |
|---|---|---|---|
| 3,558,455 | 1/1971 | Sorensen | 205/574 |
| 3,857,919 | 12/1974 | Hazen et al. | 423/9 |
| 3,876,516 | 4/1975 | Pace et al. | 204/108 |
| 4,039,405 | 8/1977 | Wong | 205/581 |
| 4,150,976 | 4/1979 | Dain | 75/719 |
| 4,222,832 | 9/1980 | Hubred | 205/581 |
| 4,275,234 | 6/1981 | Baniel et al. | 562/584 |
| 4,291,007 | 9/1981 | Baniel | 423/390 |
| 4,544,532 | 10/1985 | Kordosky | 423/24 |
| 4,776,941 | 10/1988 | Tezanos | 204/259 |
| 5,486,272 | 1/1996 | Hemsley | 205/77 |

FOREIGN PATENT DOCUMENTS

| | | |
|---|---|---|
| 9214865 | 9/1992 | WIPO . |
| 9402663 | 2/1994 | WIPO . |

OTHER PUBLICATIONS

Fukunaka and Kondo, "Electrolyte Circulation in Electrorefining Process", Metallurgical Review of MMIJ, vol. 5, No. 1 (1988), pp. 10–23 Apr., 1988.
Chemical Abstracts 78:118,395, 1973.

Primary Examiner—John Niebling
Assistant Examiner—Brendan Mee
Attorney, Agent, or Firm—Ernest G. Szoke; Wayne C. Jaeschke; Patrick J. Span

[57] ABSTRACT

An improved process is described for the recovery of copper from an aqueous feed solution using solvent extraction and electrowinning in which the electrowinning is conducted in a first step wherein the electrolyte is flowing perpendicular to the cathode surface without auxiliary mixing of the electrolyte between electrodes, and a second step wherein the electrolyte is flowing parallel to the cathode surface. In a second embodiment, solvent extraction of copper and solvent extraction of acid are conducted in alternate steps to allow more complete recovery of copper.

36 Claims, 2 Drawing Sheets

METHOD FOR RECOVERING COPPER

BACKGROUND OF THE INVENTION

This invention relates to a method for improved efficiency in recovery of copper from aqueous acidic solutions by solvent extraction.

The starting material for large scale solvent extraction is an aqueous leach solution obtained by leaching copper ions from ore. The aqueous solution is mixed in tanks with an extraction reagent which is dissolved in an organic diluent, e.g., a kerosene. The reagent includes an extractant chemical which selectively forms a metal-extractant complex with the copper ions in preference to ions of other metals. At the same time, since the extractant operates on a hydrogen exchange basis, hydrogen ions are transferred into the aqueous solution, rendering it progressively more acidic as copper extraction continues. The step of forming the complex is called the extraction or loading stage of the solvent extraction process.

The outlet of the mixer continuously feeds to a large settling tank, where the organic solvent (organic phase), now containing the copper-extractant complex in solution, is separated from the depleted aqueous solution (aqueous phase). This part of the process is called phase separation. Usually, the process of extraction is repeated through two or more mixer-settler stages, in order to more completely extract the copper.

Where two or more mixer-settler stages are employed for extraction, countercurrent flow of the aqueous feed solution and the organic phase or extractant solution is employed. In a typical 3-stage extraction system, for example, the aqueous feed solution will flow through an initial mixer-settler stage ("$E_1$"), subsequently through a second stage ("$E_2$"), and then through a final mixer-settler stage ("$E_3$"). The organic phase will, in turn, initially contact the aqueous feed solution in $E_3$, encounter a subsequent contact in $E_2$ and a final contact in $E_1$. As a result, by the time the aqueous feed solution reaches mixer-settler stage $E_3$, substantial amounts of copper will have been extracted from it and it will be contacting an organic phase low in copper. Correlatively, when the organic phase reaches mixer-settler $E_1$, much of the extractant will be in the form of copper-extractant complex and the organic phase will be contacting the aqueous feed solution when it is in a condition wherein little, if any, of the dissolved copper has been extracted.

After extraction, the depleted aqueous solution (extraction raffinate) is either discharged or recirculated for further leaching of copper from the ore. The loaded organic phase from extraction containing the dissolved copper-extractant complex is fed to another set of mixer-settlers, where it is mixed with an aqueous strip solution of relatively concentrated sulfuric acid. The highly acid strip solution breaks apart the copper-extractant complex and permits the purified and concentrated copper to pass to the strip aqueous phase. As in the extraction process described above, the mixture is fed to another settler tank for phase separation. This process of breaking apart the copper-extractant complex is called the stripping stage, and the stripping operation is optionally repeated in a counter-current manner through two or more mixer-settler stages to more completely strip the copper from the organic phase.

From the stripping settler tank, the regenerated stripped organic phase is recycled to the extraction mixers to begin extraction again, and the strip aqueous phase, known as pregnant electrolyte, is customarily fed to an electrowinning tank-house, where the copper metal values are deposited on plates by a process of electrodeposition. Simultaneous with the deposition of copper is the generation of hydrogen ions, rendering the strip aqueous phase progressively more acidic. After electrowinning the copper values from the aqueous strip solution, the solution, known as spent electrolyte, is returned to the stripping mixers to begin stripping again.

To obtain high efficiency from the organic phase, it is desirable to load the extractant to as high a copper level as possible during extraction and strip it to as low a copper level as possible during stripping. The difference between these two levels is referred to as the "net copper transfer." However, because the reactions in extraction and stripping are equilibrium reactions, the extent to which they can proceed may be limited, resulting in a decreased net copper transfer. Important factors affecting these equilibria are aqueous acidity, copper concentration in both aqueous and organic phases, and the complexation strength of the extractant.

In stripping, for example, the extent of reaction is enhanced by higher acid and lower copper concentrations. Acid concentrations, however, are limited to less than about 200 g/L sulfuric acid because of excessive anode corrosion in the electrowinning cells above that level. Copper levels are similarly limited to greater than about 25–30 g/L because of reduced electrowinning current efficiency below that level. Consequently, an organic phase of any given composition will have a minimum level to which it can be stripped with a given spent electrolyte from electrowinning. For extractants which are relatively weak in their complexing strength, this minimum level may correspond to nearly complete stripping. However, for strong extractants, such as certain hydroxy aryl aldoximes, the minimum stripping level may be high with the result that the net copper transfer is small and the organic phase can only operate with relatively low efficiency. This low efficiency means that even though an extractant may have a high complexation strength, it can extract only a small amount of copper each time it is recycled from stripping to extraction. On the other hand, if a strong extractant could be stripped more completely, it would be capable of extracting copper effectively even in the presence of relatively high acid levels.

One means which has been used to enhance the ability to strip strong extractants has been the addition to the organic phase of equilibrium modifiers, examples of which are nonylphenol, isotridecanol, and 2,2,4-trimethylpentane-1,3-diol diisobutyrate. Believed to operate through hydrogen bonding with the strong extractants, equilibrium modifiers act to allow the copper to be stripped more completely or under milder conditions. However, these modifiers have the disadvantage of also decreasing the extraction strength of the extractant, so that the effectiveness in extraction is diminished. It would be especially desirable to be able to strip extractants more completely without impairing extraction strength.

In extraction, which is essentially the reverse reaction of stripping, the extent of reaction is limited by high acid and low copper concentrations in the aqueous leach solution. Acidic leach solutions having particularly high copper initial concentrations, such as 15–30 g/L copper or above, are especially difficult to treat by solvent extraction because the extraction reaction tends to become self-limiting due to acid buildup. Since the extractant operates on a hydrogen exchange basis, each atom of copper that is extracted into the organic phase results in two atoms of hydrogen ions being transferred back to the aqueous phase, rendering it more acidic. When this exchange is carried out by extracting a sufficiently large concentration of copper, a correspondingly large concentration of acid accumulates to the point where the extractant can no longer transfer more acid to the aqueous phase, and copper extraction therefor ceases. Due to recent improvements in technology for leaching of copper sulfide concentrates to produce leach solutions of very high copper concentrations, it would be highly desirable to be able to purify the copper in these solutions by solvent extraction despite the attendant buildup of acid during extraction.

One means of overcoming excessive acid buildup during extraction would be to use a neutralizing agent such as sodium hydroxide to control the pH of the aqueous phase. However, this results in the buildup of salts in the aqueous phase as it recycles to further leaching, and would ultimately require large discharges of leachant to control the salt level. Another means would be to divert the leachant after each stage of extraction to neutralization with lime, precipitating calcium sulfate (gypsum). However, gypsum is slow to precipitate completely, and any continued precipitation when the solution was returned to the next extraction stage would cause phase separation problems due to generation of "crud," a stable mixture of emulsified organic, aqueous and solids. Furthermore, in systems where the acid generated in extraction is required to be recycled to leaching for dissolution of more copper, neutralization represents a double expense—for the base to neutralize the acid generated in extraction and for the acid that must be added again to carry out the leaching.

Direct electrowinning of copper, that is, plating of copper directly from leach solution without intervening purification by solvent extraction, has been practiced for many years. Generally, however, copper recovered by direct electrowinning is too impure for use as is, and must be refined. Purification of copper from leach solution by solvent extraction has proven a successful means of providing a concentrated copper solution suitable for electrowinning of highly pure copper metal.

Conventional electrowinning cells are typically constructed of elongated rectangular tanks containing suspended parallel flat cathodes of copper alternating with flat anodes of lead alloy, arranged perpendicular to the long axis of the tank. Copper-bearing leach solution enters the tank at one end, flows perpendicular to the plane of the parallel anodes and cathodes by passing around and beneath them, and exits the tank at the other end. Since the main flow of leach solution through the cell is perpendicular to the plane of the electrodes and there is no auxiliary mixing applied to the electrolyte between electrodes, the solution between the electrodes is relatively quiescent with the only agitation being the result of the natural effects of convection and evolution of oxygen bubbles at the anode.

A direct current voltage is applied between the cathodes and anodes, causing copper to be deposited at the cathode and water to be electrolyzed to form oxygen and protons at the anode. With conventional electrowinning cells, the rate at which direct current can be passed through the cell is effectively limited by the rate at which copper ions can pass from the solution to the cathode surface. This rate, called the limiting current density, is a function of factors such as copper concentration, cell configuration and level of agitation of the aqueous solution. Attempting to operate above the limiting current density tends to result in decreased current efficiency, porous or non-adherent deposits of copper, and increased impurities in the deposited copper. While actual operating parameters involve tradeoffs of variables such as current density and copper concentration, conventional direct electrowinning cells typically operate at current densities in the range of 20–35 amps per square foot of cathode surface, and produce spent electrolyte copper concentrations greater than about 30 g/L.

A number of modifications to electrowinning cells have been proposed as a means either of increasing current density or of electrowinning to lower copper levels. Generally, these modifications involve auxiliary means or cell redesign to induce agitation or flow of the electrolyte between electrodes. T. Balberyski, et al (Chemical Abstracts 78:118,395, 1973) describe an electrolyte distribution system using an inlet pipe placed along the center line of the cell and having ¼ inch orifices directed at the space between electrodes, and outlet pipes placed parallel to the inlet pipe. Electrolyte is recirculated between the pipes by an external pump, with good deposits reported at a current density of 35–40 amps/square foot with recirculation rates of 0.1–0.2 gallons per minute per square foot of cathode area. U.S. Pat. No. 3,876,516 describes a copper electrowinning system in which the electrolyte is circulated by means of an external pump through a distributor uniformly and upwardly between the electrodes and overflowing the side walls of the cell; voltage in the cell is reduced by maintaining a level of $SO_2$ in the electrolyte. This cell is reported to operate at a current density of 30 amps per square foot at copper concentrations down to 1 g/L.

Other modifications incorporate changes to the configuration of the conventional electrowinning cell. The CHEMELEC™ cell (Inst. Chem. Eng. Symp. Ser. (1975), 42 (Hydrometallurgy), 29.1–29.7) is capable of operation at very low metal concentrations such as 0.1 g/l. It incorporates mesh electrodes, glass beads in the space between electrodes, and a distributor at the bottom of the cell which circulates electrolyte and fluidizes the glass beads. It is believed that the fluidized glass beads impinge on the cathode surface and reduce the thickness of the boundary surface layer which has been depleted of metal, and thus enhance the rate of delivery of metal ions from the electrolyte to the surface of the cathode. While this cell operates at very low metal concentrations and is used for treatment of waste solutions, it is not suitable for large-scale metal electrowinning. Current densities are typically only 5–10 $A/ft^2$.

U.S. Pat. No. 4,776,941 describes an electrowinning cell using a hollow flat cathode with orifices in the face through which electrolyte is forced. The electrolyte flows into the space between the anode and cathode, creating turbulence and permitting operation with increased current efficiency at current densities as high as 1500 $Am^2$ (140 $A/ft^2$). However, it is not disclosed how one would remove copper from such a cathode on a large scale.

WO 92/14865 describes a cell comprising an elongate housing, preferably cylindrical, having an internal conductive surface which functions as the cathode, an anode extending into the housing, and housing ends which incorporate a fluid inlet and outlet. Preferably the inlet and outlet are disposed perpendicular to the housing axis and tangential to the housing surface, so that a spiral motion is imparted to electrolyte passing through the cell. The spiral flow pattern and a high flow rate combine to create good agitation at the cathode surface, allowing current densities of up to 2000 $A/m^2$ (186 $A/ft^2$). Current efficiency is over 95% with copper concentrations in the range of 1 to 4 g/l, and 80% with concentrations of 0.2 to 0.3 g/l. The housing may be made of copper tubing, in which case the deposited copper accumulates to a desired thickness, and the entire housing is then removed as product copper. Alternatively, the housing may be made of sheets of another conductive metal, in which case after accumulation of copper the sheets are disengaged from the copper, the copper removed as product, and the sheets are re-formed to provide the cell housing.

WO 94/02663 describes a method of metal recovery from ore which includes leaching, solvent extraction and electrowinning using the cell of WO 92/114865.

In general, electrowinning systems with electrolyte flow parallel to the electrode surface are capable of functioning at substantially lower copper concentrations than are classical electrowinning systems which rely on passive effects of convection and oxygen generation for agitation of the electrolyte between electrodes. However, the systems having directed flow between electrodes generally entail higher costs, both in terms of capital costs and operating costs. It would be desirable to be able to incorporate the benefits of a spent electrolyte with low copper levels into a solvent extraction process without the attendant high costs of a large electrowinning system to generate such a spent electrolyte.

U.S. Pat. No. 3,857,919 describes a process for separating rare earth metal values by alternately contacting the aqueous feed with a first organic solvent for the selective extraction of a first metal, and then with a second organic solvent for the selective extraction of a second metal. The primary application of this process involves the use of a tertiary alkyl amine as the first organic solvent to extract Pr, Nd and Sm, di-2-ethylhexyl phosphoric acid as the second organic solvent to extract Dy and Y, leaving Gd in the extracted aqueous phase.

U.S. Pat. No. 4,275,234 describes a process for solvent extraction of acids from aqueous solution using a water-immiscible secondary or tertiary amine extractant. Instead of stripping the acid-loaded organic phase with an alkaline solution, stripping is done with water, aided by operating at a temperature at least 20° C. higher than the temperature of extraction. The process was exemplified by extraction of phosphoric acid and a number of water soluble organic acids.

U.S. Pat. No. 4,291,007 describes a process for solvent extraction of mineral acids from aqueous solution using a mixture of an amine compound and an organic strong acid. The combination results in improved regeneration of the organic phase.

DESCRIPTION OF THE INVENTION

In this description, except where explicitly otherwise indicated, all numbers describing amounts of ingredients or reaction conditions are to be understood as modified by the word "about" in describing the broadest scope of the invention. Practice of the invention within the exact numerical limits is, however, generally preferred.

This invention provides means for improving the effectiveness and efficiency of the recovery of copper by solvent extraction and electrowinning, particularly where the extraction is accomplished using a strong extractant. More particularly, means are provided for increasing the net copper transfer in solvent extraction and extracting copper more completely from an aqueous feed solution.

In the first embodiment of the invention, the electrowinning is carried out in two stages, the first stage conducted with electrolyte flowing perpendicular to the cathode surface and without auxiliary agitation of electrolyte between electrodes, and the second stage conducted with electrolyte flowing parallel to the cathode surface. The first stage of electrowinning reduces the copper concentration in electrolyte to as low as about 30 g/l, and the second stage of electrowinning decreases the copper concentration in the spent electrolyte below about 30 g/l. Preferably the second stage of electrowinning decreases the copper below about 25 g/l, and more preferably below about 20, 15, 10, 5 or 1 g/l.

The lower copper concentration in the spent electrolyte increases its effectiveness in stripping copper from the organic phase, producing a stripped organic phase with decreased copper concentrations. This more completely stripped organic phase is in turn capable of extracting copper from the feed solution more completely, and results in a greater net transfer of copper by the organic phase.

Figure 1:
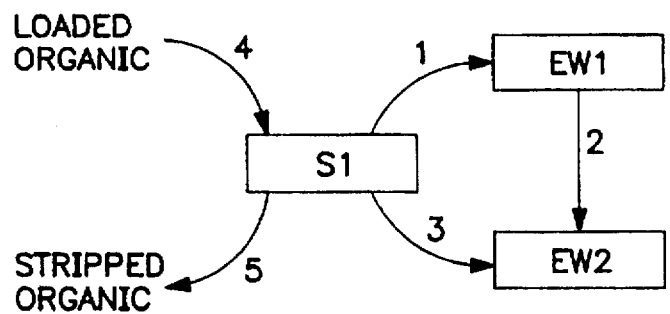
FIG. 1 to 4 are diagrammatic representations of an embodiment of the invention using two steps of copper electrowinning in combination with a solvent extraction circuit.

The arrangement between electrowinning and organic phase stripping can be configured in various manners, examples of which are shown in FIGS. 1 through 4. The simplest arrangement is shown in FIG. 1, in which pregnant electrolyte 1 from stripping passes to a first stage of electrowinning EW1 in which electrolyte flow is perpendicular to the cathode surface and the copper concentration is reduced to as low as about 30 g/l, and then passes as a partially reduced electrolyte 2 to a second stage of electrowinning E2 in which electrolyte flow is parallel to the cathode surface, and the copper concentration is reduced below about 30 g/l. The resulting spent electrolyte 3 passes to a stripping stage S1 where it is contacted with loaded organic 4, producing a stripped organic 5 and regenerating pregnant electrolyte 1.

Figure 2:
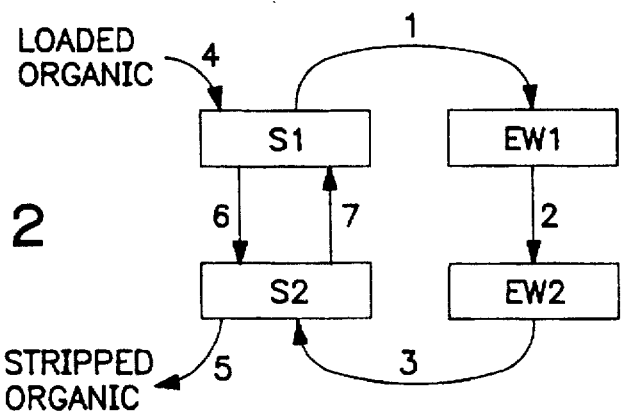

The arrangement in FIG. 2 is similar to that of FIG. 1 except that stripping is carried out in a countercurrent manner in two or more stages. Here, loaded organic 4 is first contacted with strip solution 7 in strip stage S1 and then is contacted with spent electrolyte 3 in strip stage S2, resulting in stripped organic 5. Spent electrolyte 3 advances through S2 to produce a strip solution 7 partially replenished in copper, which then advances through S1 to produce regenerated pregnant electrolyte 1. Pregnant electrolyte then passes through the two stages of electrowinning EW1 and EW2 the same as in FIG. 1. This countercurrent flow entails the cost of construction of a second stripping stage, but it provides the benefit of giving more complete stripping of the organic phase at the same time as it produces a pregnant electrolyte having a higher copper concentration.

Figure 3:
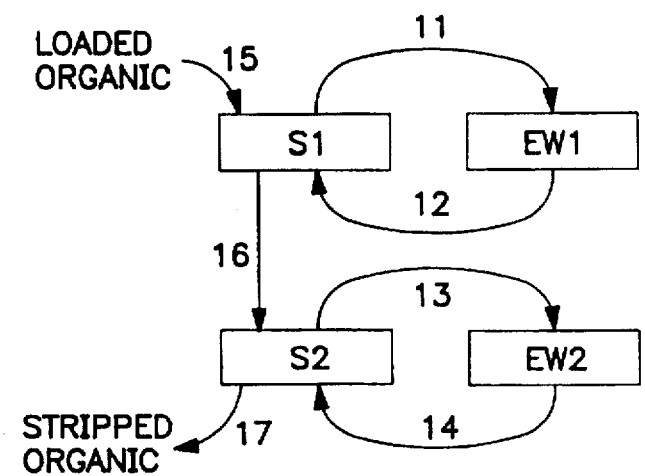

Alternatively, the system may be arranged in a crossflow configuration as shown in FIG. 3. Loaded organic phase 15 is stripped in stage S1 to generate a partially stripped organic phase 16 and a first pregnant electrolyte 11. Copper is recovered from stream 11 in an electrowinning stage EW1 having electrolyte flow perpendicular to the cathode surface, and a first spent electrolyte 12 is produced for return to stripping stage S1. Organic phase 16 is further stripped in stripping stage S2, generating stripped organic 17 and a second pregnant electrolyte 13. Copper is recovered from stream 13 in an electrowinning stage EW2 having electrolyte flow parallel to the cathode surface, and a second spent electrolyte 14 is produced for return to stripping stage S2. This system provides the benefit of matching the higher levels of copper in the first electrolyte with the more easily stripped copper from loaded organic. Correspondingly, the more difficultly stripped copper remaining on the organic after the first stripping stage is matched in the second stripping stage with the electrowinning stage having lower copper concentration. This lower copper concentration will result in more effective stripping of copper from such an organic phase.

Figure 4:
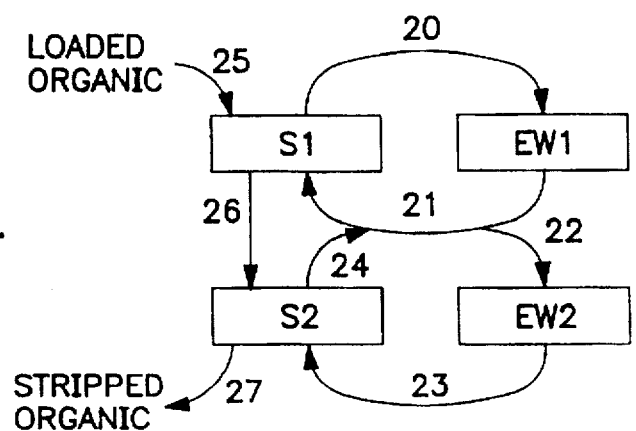

In a further alternative, shown in FIG. 4, the system is configured with mixed cross- and countercurrent flow. Similar to FIG. 3, loaded organic phase 25 is stripped in stage S1 to generate a partially stripped organic first phase 26 and a first pregnant electrolyte 20. Copper is recovered from stream 20 in an electrowinning stage EW1 having electrolyte flow perpendicular to the cathode surface, and a first spent electrolyte 21 is produced for return to stripping stage S1. A portion 22 of stream 21 is diverted to a second electrowinning stage EW2 in which electrolyte flow is parallel to the cathode surface. The copper concentration in the second spent electrolyte 23 is below about 30 g/l, and therefore making this stream more effective as a stripping solution. Second spent electrolyte 23 contacts partially stripped organic phase 26 in strip stage S2, producing stripped organic 27 and a copper-enriched electrolyte stream 24. Stream 24 is recombined with the first spent electrolyte 21, and passed to strip stage S1 for contact again with loaded organic 25. By varying the proportion of spent electrolyte 21 which is diverted to stream 22, one has the opportunity to size the more expensive second electrowinning stage to give optimum performance for the overall system.

A preferred mode of performing the first step of electrowinning uses cells of well-known design in which alternating flat sheets of cathodes and anodes are suspended in elongated rectangular tanks of electrolyte, a direct electric current is applied between the cathodes and anodes, and electrolyte flows perpendicular to the plane of the electrodes. Velocity of electrolyte through this type of cell is relatively low, and electrolyte in the space between electrodes is passively agitated mainly by convection currents and by evolution of oxygen at the anode. Electrolyte exiting one end of the cell may be recirculated to the input end of the cell to increase overall velocity of electrolyte in the cell, but the flow pattern remains basically unchanged. Electrowinning cells of this type operate with relatively low pumping costs, and labor costs benefit from the large-scale handling of cathodes.

Electrowinning cells having auxiliary agitation of electrolyte between electrodes, and cells having electrolyte flow directed parallel to the plane of the cathodes, benefit from more facile delivery of copper ions from the electrolyte to the cathode surface where they can be reduced and plated as metallic copper. This benefit can be exploited by operating at a higher current density, by electrowinning to produce lower concentrations of copper, or both. While increased current density is desirable because it allows greater throughput with smaller equipment, the use according to this invention operates to give substantially lower copper concentrations. This lower copper concentration allows a more complete stripping of the loaded organic phase, which in turn permits more complete extraction of copper and greater net transfer of copper by the solvent extraction system. Electrowinning cells having agitated electrolyte or directed electrolyte flow parallel to the cathodes tend to have high pumping costs, and handling and recovery of copper cathodes is relatively more labor intensive. A desirable feature of the present invention is the use of lower cost conventional electrowinning with electrolyte flow perpendicular to the electrodes to remove the copper which is most easily recovered, followed by the use of higher cost electrowinning with agitated or directed electrolyte flow parallel to the electrodes to remove only that copper which is more difficult to recover. The combination of the two steps allows low levels of copper to be reached in spent electrolyte with minimum cost.

A preferred electrowinning means having electrolyte flow parallel to the cathode is the cell illustrated in FIG. 3 of patent application WO 92-14865 which is hereby incorporated by reference along with the text of the specification describing FIG. 3. In this cell, the cathode comprises a thin-walled cylindrical tube, the anode comprises a rod positioned at the axis of the tube, and caps at either end of the tube incorporate inlet and outlet means which are positioned perpendicular to the tube axis and tangential to the tube surface so that a spiral motion is imparted to the electrolyte flowing through the tube. A direct electric current is applied between the anode and cathode, and the conditions of the spiral flow pattern allow operation at increased current density and lower copper concentrations. Flow rates will depend on the exact geometry and dimensions of the cell, but preferably the electrolyte will pass longitudinally along the axis of the cell with a velocity of between about 0.5 and about 10 meters per minute. More preferably the longitudinal velocity of electrolyte will be from about 6 to about 8.5 meters per minute. For a cell 10 cm in diameter, the preferred velocity corresponds to a volumetric flow rate of between about 4 and about 80 liters per minute, with a more preferable flow rate of about 50 to about 70 liters per minute. Due to the spiral motion of the electrolyte in the cell, the actual velocity of electrolyte relative to the cathode surface will be substantially greater than the longitudinal velocity along the axis of the cell. Electrolyte may be recirculated through the cell to obtain the desired flow rates.

The benefit of generating a spent electrolyte low in copper concentration is realized most effectively when the solvent extraction is conducted with an organic phase comprising a strong extractant. A strong extractant is one which complexes tightly with copper, and thus is capable of extracting copper at a low pH, but which also is more difficult to strip. Extractant strength is often described in terms of the $pH_{1/2}$ of the extractant, defined generally as the pH at which 50% of the copper is extracted. For purposes of this invention, since precise $pH_{1/2}$ values depend on the conditions used, a $pH_{1/2}$ value is defined as the pH at which a 0.2 molar solution of the extractant in an aliphatic hydrocarbon solution is in equilibrium with a 0.1 molar solution of copper as copper perchlorate, and is loaded with 50% of the theoretical uptake of copper. Using this definition, a strong copper extractant is one having a $PH_{1/2}$ less than 1.0.

Preferred extractants are those having $PH_{1/2}$ values less than about 1.0, with especially preferred extractants having $PH_{1/2}$ values less than about 0.5. Preferred extractants for use in the invention include those containing one or more hydroxyl aryl oximes of the hydroxy aryl ketoxime or aldoxime type. Preferred hydroxy aryl ketoxime extractants are those of formula I and II below:

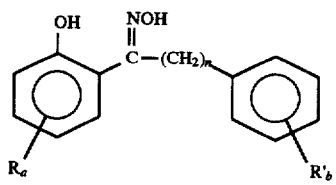

(I)

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined; n is 0 or 1; and a and b are each 0, 1, 2, 3, or 4, with the proviso that both are not 0 and the total number of carbon atoms in $R_a$ and $R'_b$ is from 3 to 25,

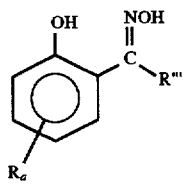

(II)

in which R and a are as defined with respect to formula I and R'" is a saturated aliphatic group of 1-25 carbon atoms or an ethylenically unsaturated aliphatic group of 3-25 carbon atoms, with the proviso that the total number of carbon atoms in $R_a$ and R'" is from 3 to 25.

Preferred compounds of Formula I are those wherein a is 1, b is 0, R is a straight or branched chain alkyl group having from 7 to 12 carbon atoms, and wherein R is attached in a position para to the hydroxyl group. Among these, the more preferred are those wherein R is a mixture of isomers. Preferred compounds of Formula II are those wherein R'" is methyl and R and a are as designated as being preferred for compounds of Formula I.

Preferred compounds of Formula I wherein n has a value of 0 (i.e., hydroxybenzophenone oxime compounds) include those having a single alkyl ring substitutent having from 7 to 12 carbon atoms in a position para to the hydroxy group, which alkyl substitutent is a mixture of isomers. Examples of such compounds are 2-hydroxy-5-nonylbenzophenone oxime and 2-hydroxy-5-dodecylbenzophenone oxime which are obtained as mixtures of alkyl isomeric forms when commercial nonylphenol and dodecylphenol are respectively employed in their synthesis.

Preferred phenyl alkyl ketone oximes of Formula II are those having an isomeric mixture of 7 to 12 carbon alkyl groups as a single substitutent on the ring para to the hydroxyl group. Also preferred are compounds wherein the R'" alkyl group is methyl. Illustrative of preferred phenyl alkyl ketone oxime compounds is 2-hydroxy-5-nonylphenyl methyl ketone oxime manufactured through the use of commercial nonylphenol.

Hydroxy aryl aldoxime extractants which may be employed in the invention are those of Formula III

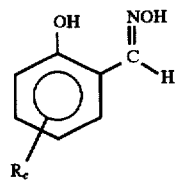

(III)

in which c has a value of 1, 2, 3 or 4, R is a saturated aliphatic group of about 1 to about 25 carbon atoms or an ethylenically unsaturated aliphatic group of 3 to about 25 carbon atoms, and the total number of carbon atoms in $R_c$ is from 3 to about 25. Preferred compounds are those wherein a is 1, and R is a straight or branched chain alkyl group having from about 7 to about 12 carbon atoms and wherein R is attached in a position para to the hydroxyl group. Among these, the more preferred are those wherein R is a mixture of isomers. Compounds which are especially useful include 2-hydroxy-5-heptylbenzaldoxime, 2-hydroxy-5-octylbenzaldoxime, 2-hydroxy-5-nonylbenzaldoxime and 2-hydroxy-5-dodecylbenzaldoxime.

The extractant according to the invention may contain mixtures of oximes of Formulas I, II or III. A preferred mixture is that of 2-hydroxy-5-nonylacetophenone oxime and either 2-hydroxy-5-nonylbenzaldoxime or 2-hydroxy-5-dodecylbenzaldoxime.

Generally, the extractant is dissolved in a water-insoluble, water immiscible aliphatic or aromatic solvent. Acceptable solvents include kerosene, benzene, toluene, xylene and the like. Preferred solvents are the aliphatic and aromatic hydrocarbons having flash points of 130 degrees Fahrenheit and higher, and preferably at least 150 degrees, and solubilities in water of less than 0.1% by weight. Representative commercial available solvents are Chevron ion exchange solvent (available from Standard Oil of California, having a flash point of 195° F.), Escaid 100 and 110 (available from Exxon-Europe having a flash point of 180° F.), Conoco 170 Exempt Solvent (available from Conoco, flash point 170° F.), Exxon Aromatic 150 (an aromatic kerosene available from Exxon-USA, flash point 150° F.), Phillips SX 1 and 7 (available from Philips Petroleum, flash point 160° F.), and various other kerosene and petroleum fractions available from other oil companies.

In addition to the extractant, the organic phase may contain one or more equilibrium modifiers which are capable of increasing the effective $PH_{1/2}$ of the extractant. Equilibrium modifiers act to weaken the extraction strength of an extractant and render it easier to strip. In general, it is believed that equilibrium modifiers exert their effect by hydrogen bonding with the extractant, shifting the equilibrium of the extraction reaction toward the uncomplexed extractant. Examples of equilibrium modifiers include alcohols such as tridecanol or 2-ethylhexanol, phenols such as nonylphenol, esters such as tributyl phosphate or 2,2,4-trimethyl-1,3-pentanediol di-isobutyrate, ethers such as benzyl 2-butoxy ethyl ether, ketones such as isobutyl heptyl ketone, nitriles such undecyl cyanide, carbamates such as N-octyl isotridecylcarbamate, amides such as N, N'-bis-2-ethylhexyl urea, and sulfoxides such as di-2-ethylhexylsulfoxide.

It is preferred that the organic phase contain no equilibrium modifier, or that it contain as little equilibrium modifier as possible. Rather than enable more complete stripping by weakening the extractant's copper extraction power, it is an objective of this invention to enable improved stripping by decreasing the copper concentration in the aqueous strip solution. However, for a given organic phase, whether or not it contains an equilibrium modifier, the net copper transfer will be increased by use of this invention.

Another benefit of this invention is that a lower concentration of acid can be used in the stripping solution without diminishing the completeness of stripping of the organic phase. Thus a copper recovery system can be optimized to balance the benefits of increased stripping of the organic phase and the benefits of lower stripping acid concentrations.

In the second embodiment of this invention, a system is provided for enhanced recovery of copper from aqueous feed solutions having relatively high concentrations of copper. Such solutions can be produced by a variety of means, such as by ultra fine grinding of copper sulfide minerals followed by mild pressure oxidation to produce solutions of 25-30 g/l copper. In the ion exchange of copper solvent extraction operations, each copper atom extracted into the organic phase is matched with two hydrogen ions transferred into the aqueous phase. Thus, if large concentrations of copper are provided in the feed solution, the aqueous will become progressively more acidic as copper extraction takes place. If this acidity builds to a sufficiently high level, the extraction reaction will reach equilibrium and stop. This invention provides an improvement in the overall recovery of copper by adding further steps to the process. In a process for the solvent extraction of copper from an aqueous feed solution, wherein said aqueous feed solution is contacted with a first organic extractant solution to produce a loaded first organic solution enriched in copper and an aqueous solution depleted in copper and enriched in acid, and the loaded first organic solution is contacted with a strong acid strip solution to produce a stripped first organic solution depleted in copper and a pregnant strong acid strip solution enriched in copper, the improvement comprises the additional steps of (1) contacting said aqueous solution depleted in copper and enriched in acid with a second organic solution of an extractant capable of extracting a mineral acid, (2) separating the phases to produce a loaded second organic solution enriched in acid and an aqueous solution depleted in acid, (3) contacting said aqueous solution depleted in acid with a second portion of the first organic extractant solution, and (4) separating the phases to produce a loaded first organic solution enriched in copper and an aqueous solution further depleted in copper and enriched again in acid.

In this way, the accumulated aqueous acid that impedes extraction of copper is removed in a separate step, allowing further extraction of copper to take place in a subsequent contact. The process of the invention is shown schematically in FIG. 5, in which aqueous feed solution 30 is contacted in a first extraction stage E1 with a first organic extractant solution 34 to produce an aqueous solution 31 partially depleted in copper and enriched in acid and a loaded first organic solution 35 enriched in copper. Loaded organic solution 35 is stripped in a strip stage S1, producing stripped organic solution 34 for recycle to extraction stage E1. Aqueous stream 31 is contacted in extraction stage E2 with a second organic solution 36 containing an extractant capable of extracting acid, producing a second loaded organic solution 37 enriched in acid and an aqueous solution 32 depleted in acid. Loaded organic solution 37 is stripped of acid in strip stage S2, producing stripped organic solution 36 for recycle to extraction stage E2. Aqueous solution 32 is then contacted in extraction stage E3 with a second portion 38 of the first organic extractant solution, producing a loaded organic solution 39 enriched in copper and an aqueous raffinate 33 depleted in copper. Loaded organic solution 39 is stripped in a strip stage S3, producing stripped organic solution 38 for recycle to extraction stage E3. It is understood that either the extraction or stripping stages may be conducted in one or more units of physical contact. Preferably, when the contact is carried out with more than one contact, the solutions are advanced through the contacts counter-current to each other. Optionally, strip stages S1 and S3 may be combined in a large copper strip stage since they perform the same chemical function.

Figure 5:
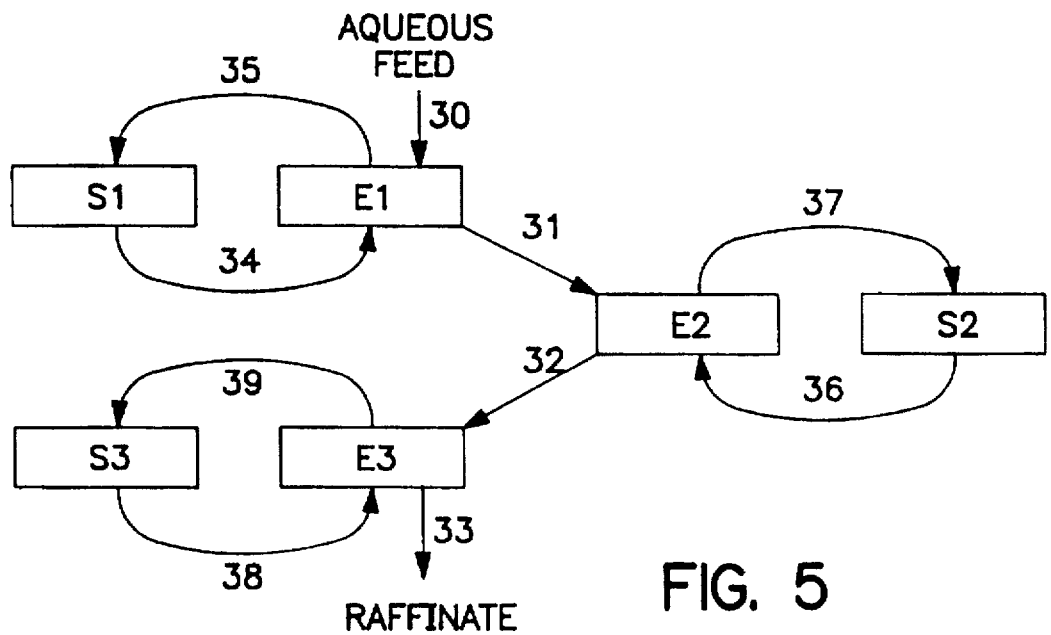
FIGS. 5 and 6 are diagrammatic representations of an embodiment of the invention using acid extraction alternately with copper extraction in a solvent extraction circuit.
Figure 6:
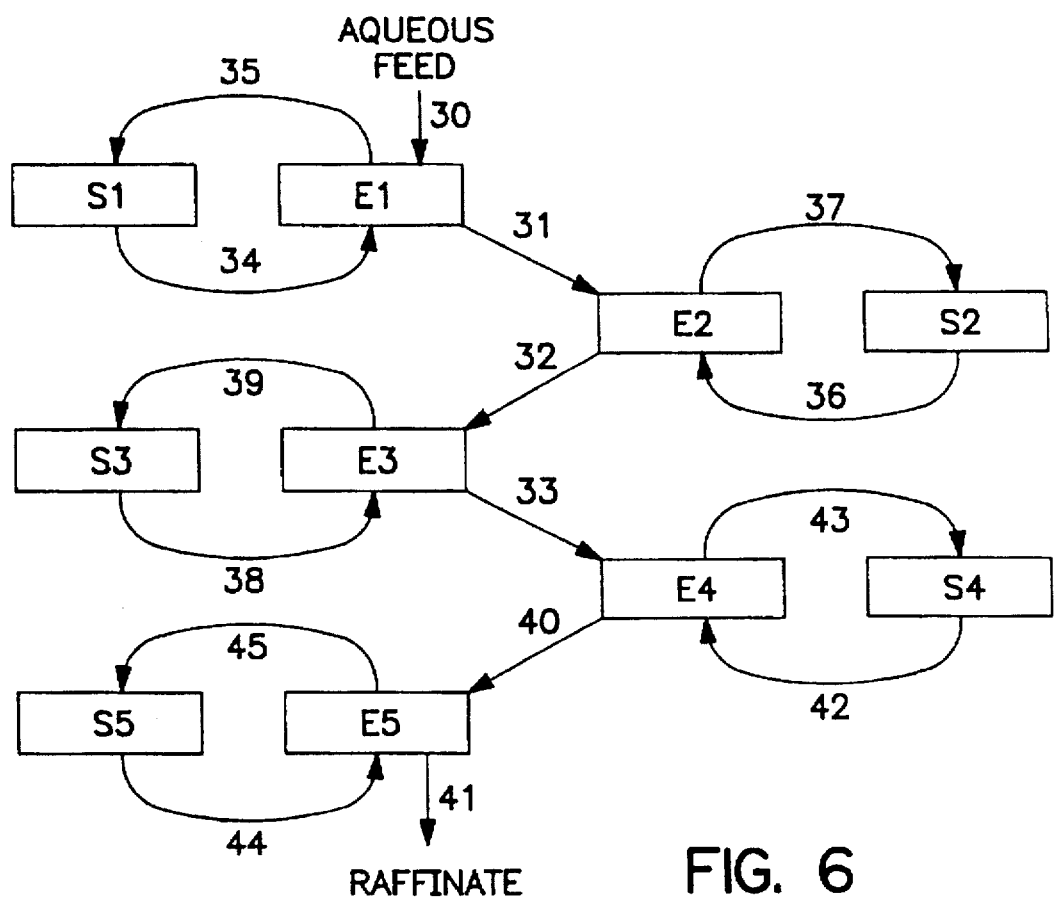

In the event that copper extraction is not sufficiently complete in the process shown schematically in FIG. 5, an additional contact of the aqueous phase with the acid-extracting organic solution may be carried out prior to a third copper extraction contact. Shown schematically in FIG. 6, the process of FIG. 5 is expanded by contacting the aqueous raffinate 33 in extraction stage E4 with a second portion 42 of the second organic solution, producing a loaded organic solution 43 enriched in acid and an aqueous solution 40 depleted in acid. Loaded organic solution 43 is stripped of acid in strip stage S4, producing stripped organic solution 42 for recycle to extraction stage E4. Aqueous solution 40 is then contacted in extraction stage E5 with a second portion 44 of the first organic extractant solution, producing a loaded organic solution 45 enriched in copper and an aqueous raffinate 41 depleted in copper. Loaded organic solution 45 is stripped in a strip stage S5, producing stripped organic solution 44 for recycle to extraction stage E5. As in FIG. 5, either the extraction or stripping stages may be conducted in one or more units of physical contact, preferably with countercurrent flow of organic and aqueous solutions when using more than one unit of contact. Preferably, contacts are made in continuous mixer-settlers operating with countercurrent flow of organic and aqueous solutions. Optionally, strip stages S1, S3 and S5 may be combined in a large copper strip stage, and strip stages S2 and S4 may be combined in a large acid strip stage.

As in the first embodiment of this invention, the first organic extractant solution for extraction of copper is preferably a solution of one or more hydroxy aryl oximes of the Formulas I, II or III

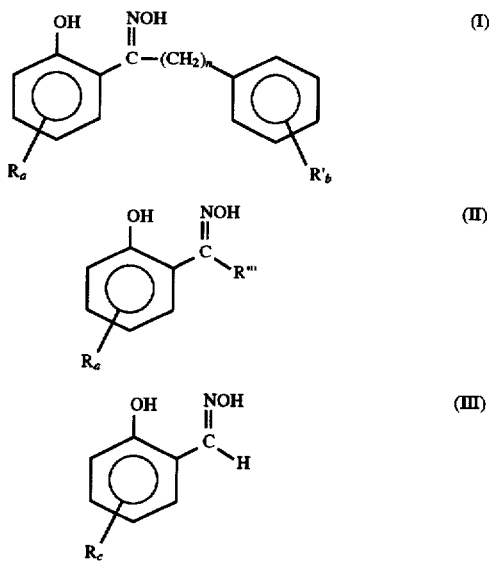

in which R, R', R'', R''', a, b, c and n are as described hereinbefore. Preferred compounds are those wherein a and c are 1, b and n are 0, R''' is methyl, and R is a straight or branched chain alkyl group having from about 7 to about 12 carbon atoms and wherein R is attached in a position para to the hydroxyl group. Among these, the more preferred are compounds wherein R is a mixture of isomers. Particularly preferred oximes are those of Formula III, including one or more of 2-hydroxy-5-heptylbenzaldoxime, 2-hydroxy-5-octylbenzaldoxime, 2-hydroxy-5-nonylbenzaldoxime and 2-hydroxy-5-dodecylbenzaldoxime.

The second organic extractant solution, which functions for the extraction of acid, is an organic solution of a compound of sufficient basicity to be protonated in the organic phase when in contact with an aqueous phase of at least about pH 1, and preferably at least about pH 2. Preferred acid extractants are oil-soluble, water insoluble amines, either primary, secondary or tertiary. Especially preferred acid extractants are tri-alkyl tertiary amines wherein the total number of carbon atoms in the alkyl groups is at least 22, preferably at least 24 carbon atoms, and each of the alkyl groups has at least four carbon atoms. Examples of preferred tertiary amines are tri-isooctylamine, tridodecylamine, and tri-($C_8$–$C_{10}$alkyl)amine, the latter being a compound where the alkyl groups are derived from a source of fatty alkyl groups wherein the eight carbon and ten carbon alkyl groups predominate.

Another preferred acid extractant is a mixture of an amine and a strong organic acid, both of which are oil-soluble and water-insoluble. Such mixtures are described in U.S. Pat. No. 4,291,007, the contents of which are incorporated by reference. Preferred amines are the previously described trialkyl tertiary amines. Preferred strong organic acids are sulfonic acids, phosphoric acid esters, alkyl phosphonic acid esters, and dialkyl phosphinic acids.

Stripping of acid from the loaded second organic solution may be accomplished in either of two ways. If it is desired to recover the acid values for recycle to leaching, the loaded organic solution may be contacted with water, allowing the acid to distribute to the aqueous phase. The stripping contact may be carried out at an elevated temperature to enable greater concentrations of acid to be produced in the aqueous phase; preferred temperatures are in the range of 30° to 60° C. If recovery of acid is not desired, the loaded organic solution may be contacted with an alkaline aqueous solution. The alkaline solution may contain enough alkalinity to consume all the acid in the organic solution with which it is contacted, or an alkaline material may be added to the mixture of organic and aqueous phase during the contacting in order to maintain the pH at a preferred level. When the leaching system is based on sulfuric acid, preferred alkaline materials include sodium hydroxide and ammonium hydroxide. When other acids such as hydrochloric acid or nitric acid are employed, calcium hydroxide is also preferred.

Stripping of copper from the loaded first organic solution is normally accomplished using a spent electrolyte from electrowinning comprising sulfuric acid and copper sulfate. To maximize the extent of stripping, and thus increase the amount of copper that can be extracted, it is preferred to conduct the electrowinning according to the first embodiment of this invention, that is, with a first stage of electrowinning wherein electrolyte flow is perpendicular to the cathode surface and a second stage of electrowinning wherein electrolyte flow is parallel to the cathode surface. It is especially preferred that the second stage of electrowinning having electrolyte flow parallel to the cathode surface be conducted using a cell as described in patent application WO 92-14865.

EXPERIMENTAL

A 20 v/v% solution of LIX 860 was prepared by dissolving 100 ml LIX 860 (a kerosene solution of 5-nonylsalicylaldehyde oxime available from Henkel Corporation) in SK-1 kerosene and diluting to 500 ml. This organic solution was loaded with copper by contacting it with 500 ml aqueous solution containing 39.5 g $CuSO_4 \cdot 5H_2O$; the loaded organic was filtered and analyzed to contain 11.09 g/l Cu. A strip solution was prepared containing 225 g/L $H_2SO_4$. Loaded organic and strip solution were contacted at various organic/aqueous (O/A) ratios by shaking in a separatory funnel for 10 minutes, and filtering the separated organic and aqueous phases. Copper concentrations were determined by atomic adsorption spectroscopy. Sulfuric acid concentrations in the produced strip solutions were calculated by multiplying the aqueous copper concentration by 98/63.5 and subtracting from 225. The results are shown in Table 1.

TABLE 1

Effect of aqueous copper and acid concentration on stripping

| Organic/ Aqueous Ratio | Organic Copper, g/l | Percent Stripped | Aqueous Copper, g/l | Aqueous $H_2SO_4$, g/l |
|---|---|---|---|---|
| 10/1 | 7.13 | 36 | 40.0 | 163 |
| 5/1 | 5.69 | 49 | 28.0 | 181 |
| 2/1 | 3.48 | 69 | 14.8 | 202 |
| 1/1 | 2.20 | 80 | 8.66 | 212 |
| 0.5/1 | 1.26 | 89 | 4.85 | 218 |

The data clearly show that lower aqueous copper concentrations, along with correspondingly increased acid concentrations, are much more effective in stripping copper from a strong extractant such as 5-nonylsalicylaldehyde oxime. A stripped organic containing only 1.26 g/l Cu will in turn be much more effective in extracting copper and will have a much higher net copper transfer than a stripped organic containing 7.13 or even 5.69 g/l Cu.

What is claimed is:

1. An improved process for the recovery of copper from an aqueous feed solution by solvent extraction, stripping and electrowinning, the improvement comprising conducting a first electrowinning step in a first electrowinning cell with electrolyte flowing perpendicular to the plane of the electrodes and without auxiliary mixing of electrolyte between the electrodes and conducting a second electrowinning step in a second electrowinning cell with the electrolyte from the first electrowinning step flowing parallel to the cathode surface, whereby the copper concentration of electrolyte after the second electrowinning step is reduced below about 30 g/l.

2. A process as defined in claim 1 wherein said stripping is conducted in at least two stripping stages of contacting means.

3. A process as defined in claim 2 wherein said contacting means comprise mixer-settlers.

4. A process as defined in claim 2 wherein the electrolyte of said first electrowinning step is recirculated in a closed loop with the first stripping stage, and the electrolyte of said second electrowinning step is recirculated in a closed loop with the remaining stripping stages.

5. A process as defined in claim 2 wherein the electrolyte of said first electrowinning step is recirculated in a first loop with the first stripping stage, and a portion of the first electrolyte is diverted from said first loop after electrowinning to a second loop comprising (1) electrowinning in said second electrowinning step, (2) stripping in the remaining stripping stages, and (3) recombining with electrolyte in said first loop.

6. A process as defined in claim 1 wherein said solvent extraction of copper is conducted with an organic solution comprising one or more hydroxy aryl oxime extractants.

7. A process as defined in claim 6 wherein said solvent extraction of copper is conducted with an organic solution of a strong extractant.

8. A process as defined in claim 7 wherein said strong extractant comprises a hydroxy aryl aldoxime of formula III

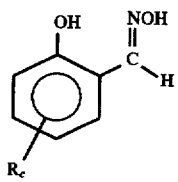

(III)

wherein c has a value of 1, 2, 3 or 4, R is a saturated aliphatic group of about 1 to about 25 carbon atoms or an ethylenically unsaturated aliphatic group of 3 to about 25 carbon atoms, and the total number of carbon atoms in $R_c$ is from 3 to about 25.

9. A process as defined in claim 8 wherein said hydroxy aryl aldoxime is selected from the group consisting of 2-hydroxy-5-heptylbenzaldoxime, 2-hydroxy-5-octylbenzaldoxime, 2-hydroxy-5-nonylbenzaldoxime and 2-hydroxy-5-dodecylbenzaldoxime.

10. A process as defined in claim 7 wherein said organic solution also contains an equilibrium modifier.

11. A process as defined in claim 6 wherein said organic solution comprises a mixture of a hydroxy aryl ketone oxime and a hydroxy aryl aldehyde oxime.

12. A process as defined in claim 11 wherein said hydroxy aryl ketone oxime is a 2-hydroxy-5-alkylacetophenone oxime and said hydroxy aryl aldehyde oxime is a 2-hydroxy-5-alkylbenzaldehyde oxime.

13. A process as defined in claim 1 wherein the condition of electrolyte flowing parallel to the cathode surface in said second electrowinning step is provided by one or more cells, each cell comprising an elongate cylindrical housing having an internal conductive surface which functions as a cathode, an anode extending into the housing disposed at the axis of the cylindrical housing, electrical terminations for connecting an electrical circuit to said conductive surface and said anode, housing ends, and inlet and outlet means at opposite ends of the housing disposed perpendicular to the housing axis and tangential to the housing surface.

14. A process as defined in claim 13 wherein a spiral motion is imparted to electrolyte passing through the cell.

15. An improved process for the solvent extraction of copper from an aqueous feed solution, wherein said aqueous feed solution is contacted with a first organic extractant solution to produce a loaded first organic solution enriched in copper and an aqueous solution depleted in copper and enriched in acid, and the loaded first organic solution is contacted with a strong acid strip solution to produce a stripped first organic solution depleted in copper and a pregnant strong acid strip solution enriched in copper, the improvement comprising the additional steps of (1) contacting said aqueous solution depleted in copper and enriched in acid with a second organic extractant solution capable of extracting a mineral acid, (2) separating the phases, to produce a second loaded organic solution enriched in acid and an aqueous solution depleted in acid, (3) contacting said aqueous solution depleted in acid with a second portion of the first organic extractant solution, and (4) separating the phases to produce a loaded organic solution enriched in copper and an aqueous solution further depleted in copper and enriched again in acid.

16. A process as defined in claim 15 comprising the additional steps of (5) contacting said aqueous solution further depleted in copper and enriched again in acid with a second portion of said second organic solution of an extractant capable of extracting a mineral acid, (6) separating the phases to produce a further portion of second loaded organic solution enriched in acid and an aqueous solution depleted a second time in acid, (7) contacting said aqueous solution depleted a second time in acid with a third portion of the first organic extractant solution, and (8) separating the phases to produce a third portion of first loaded organic solution and an aqueous solution further depleted in copper and enriched again in acid.

17. A process as defined in claim 15 wherein said first organic extractant solution comprises an organic solution of a strong extractant for copper.

18. A process as defined in claim 17 wherein said strong extractant for copper comprises a hydroxy aryl aldoxime of Formula III

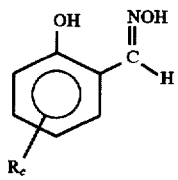

(III)

wherein c has a value of 1,2,3 or 4, R is a saturated aliphatic group of about 1 to about 25 carbon atoms or an ethylenically unsaturated aliphatic group of 3 to about 25 carbon atoms, and the total number of carbon atoms in $R_c$ is from 3 to about 25.

19. A process as defined in claim 18 wherein said hydroxy aryl aldoxime is selected from the group consisting of 2-hydroxy-5-heptylbenzaldoxime, 2-hydroxy-5-octylbenzaldoxime, 2-hydroxy-5-nonylbenzaldoxime and 2-hydroxy-5-dodecylbenzaldoxime.

20. A process as defined in claim 17 wherein said organic solution also contains an equilibrium modifier.

21. A process as defined in claim 17 wherein said organic solution comprises a mixture of a hydroxy aryl ketone oxime and a hydroxy aryl aldehyde oxime.

22. A process as defined in claim 21 wherein said hydroxy aryl ketone oxime is a 2-hydroxy-5-alkylacetophenone oxime and said hydroxy aryl aldehyde oxime is a 2-hydroxy-5-alkylbenzaldehyde oxime.

23. A process as defined in claim 15 wherein said second organic extractant solution comprises an organic solution of a basic extractant capable of being protonated in the organic phase when in contact with an aqueous phase of at least about pH 1.

24. A process as defined in claim 23 wherein said basic extractant comprises an amine.

25. A process as defined in claim 24 wherein said amine is a trialkyl amine in which the total number of carbons in the alkyl groups is at least 22 and each of the alkyl groups has at least four carbon atoms.

26. A process as defined in claim 25 wherein said trialkyl amine is chosen from the group consisting of tri-isooctylamine, tridodecylamine, and tri-($C_8$–$C_{10}$alkyl) amine.

27. A process as defined in claim 23 wherein said basic extractant comprises a mixture of an amine and a strong organic acid.

28. A process as defined in claim 27 wherein said amine is a trialkyl amine in which the total number of carbons in the alkyl groups is at least 22 and each of the alkyl groups has at least four carbon atoms.

29. A process as defined in claim 27 wherein said strong organic acid is selected from the group consisting of sulfonic acids, phosphoric acid esters, alkylphosphonic acid esters, and dialkylphosphinic esters.

30. A process as defined in claim 15 comprising the additional step of stripping acid from said second loaded organic solution to produce a stripped organic for recycle to step (1).

31. A process as defined in claim 30 wherein said step of stripping acid is accomplished by contacting said second loaded organic solution with water.

32. A process as defined in claim 31 wherein said contacting is conducted at a temperature of at least 30° C.

33. A process as defined in claim 30 wherein said step of stripping acid is accomplished by contacting said second loaded organic solution with an aqueous alkaline solution.

34. A process as defined in claim 15 comprising the additional step of removing copper from said pregnant strong acid strip solution enriched in copper by electrowinning.

35. A process as defined in claim 34 wherein said electrowinning comprises a first step conducted with electrolyte flowing perpendicular to the cathode surface and without auxiliary mixing of electrolyte between electrodes, and a second step conducted with electrolyte flowing parallel to the cathode surface, whereby the copper concentration of electrolyte after electrowinning is reduced below about 30 g/l.

36. A process as defined in claim 35 wherein the condition of electrolyte flowing parallel to the cathode surface in said second electrowinning step is provided by one or more cells, each cell comprising an elongate cylindrical housing having an internal conductive surface which functions as a cathode, an anode extending into the housing disposed at the axis of the cylindrical housing, electrical terminations for connecting an electrical circuit to said conductive surface and said anode, housing ends, and inlet and outlet means at opposite ends of the housing disposed perpendicular to the housing axis and tangential to the housing surface such that a spiral motion is imparted to electrolyte passing through the cell.

* * * * *